United States Patent [19]

Steiner

[11] Patent Number: 5,483,831
[45] Date of Patent: Jan. 16, 1996

[54] DIRECT LIQUID LEVEL READING DEVICE

[76] Inventor: George A. Steiner, 4425 Harvard Ave., Montreal, Quebec, Canada, H4A 2W9

[21] Appl. No.: 149,599

[22] Filed: Nov. 9, 1993

[51] Int. Cl.⁶ ............................. G01F 23/60; G06K 7/10
[52] U.S. Cl. .................................. 73/313; 73/319
[58] Field of Search .................... 73/310, 319, 313; 250/900, 901; 340/619, 624, 870.16

[56] References Cited

U.S. PATENT DOCUMENTS

| | | | |
|---|---|---|---|
| 872,753 | 12/1907 | Runyon | 73/310 |
| 2,685,797 | 8/1954 | Morschel | 73/319 |
| 2,975,403 | 3/1961 | Doersam, Jr. | 340/870.16 |
| 3,154,946 | 11/1964 | Ordorica et al. | 73/319 |
| 3,558,861 | 1/1971 | Collins et al. | 73/313 |
| 3,935,741 | 2/1976 | Zinsmeyer et al. | 73/313 |
| 4,014,015 | 3/1977 | Gundlach | 73/290 R X |
| 4,079,627 | 3/1978 | Gundlach | 73/313 |
| 4,589,282 | 5/1986 | Dumery | 73/313 |
| 4,625,549 | 12/1986 | Mahoney | 73/327 |
| 4,779,460 | 10/1988 | Crucikshank | 73/313 |
| 4,821,570 | 4/1989 | Khoi | 73/313 X |
| 4,848,149 | 7/1989 | Fiorensino et al. | 73/293 |
| 5,008,556 | 4/1991 | Mersch | 250/560 |
| 5,054,319 | 10/1991 | Fling | 73/319 |
| 5,245,874 | 9/1993 | Baer | 73/313 |

FOREIGN PATENT DOCUMENTS

| | | | |
|---|---|---|---|
| 1-316615 | 12/1989 | Japan . | |
| 4259825 | 9/1992 | Japan | 73/313 |
| 304445 | 7/1971 | U.S.S.R. | 73/313 |

*Primary Examiner*—William A. Cuchlinski, Jr.
*Assistant Examiner*—Willie Morris Worth
*Attorney, Agent, or Firm*—Townsend and Townsend and Crew

[57] ABSTRACT

A digital liquid level measuring device determines the liquid level by reading a scale of a vertical series of horizontal binary coded numbers representing linear divisions. The measurement is direct rather than inferential and provides more accurate reading than existing methods. The digital measuring system does not suffer from the disadvantages of signal stability, drift, accuracy, calibration, error detection and size of range. The device has a fixed vertical scale, a float movable in a substantially vertical path maintaining a controlled distance from the fixed scale, a reading head on the float to read each of the horizontal binary coded numbers individually on the scale representing liquid level and a connection from the reading level to a display which provides an indication of liquid level.

8 Claims, 4 Drawing Sheets

5,483,831

DIRECT LIQUID LEVEL READING DEVICE

TECHNICAL FIELD

The present invention relates to a digital liquid level measuring device, more specifically a device that determines the liquid level by reading a scale of a vertical series of horizontal binary coded numbers representing linear divisions.

BACKGROUND ART

Liquid level in a body of liquid, either in a vessel or outside a vessel, may be measured by any number of means including capacitance, ultrasonics, pneumatic float with magnet closing, multiple reed switches converted to resistance, mechanical floating arm changing the resistance of a rheostat and simple visual measurement of the liquid level on a scale.

Each of these methods, except simple visual measurement, are inferential measurements, that is to say, the electrical methods of measuring are analogue which are not as accurate as digital methods and suffer from the disadvantages of signal stability, drift, accuracy, calibration, error detection and size of range. Even visual measurement can suffer from reading errors.

Devices are available for optically or magnetically counting graduations to detect movement or to determine position. However, in the case of linear encoders, these graduations are not numbers themselves and the reading must be referenced to some starting point each time a reading is taken. In the case of rotary shaft encoders, the shaft position is a number read optically or magnetically, but the reading head remains stationary.

It is known that there are devices to read optical codes such as bar codes. In this case the optical reader may be moved over the bar coded item, or alternatively the optical reader is stationary and the bar coded item moves across the reader.

SUMMARY OF THE INVENTION

It is one aim of the present invention to provide a liquid level measuring device using a series of horizontal binary coded numbers representing linear divisions. These numbers are placed on a vertical scale with each number representing a particular linear division such as a millimeter, fraction of an inch, or any other linear division required for a specific purpose.

The horizontal binary coded numbers are read by a reading device attached to a float. Thus, as the float moves up and down the scale, it reads each of the horizontal binary coded numbers representing linear divisions. The bits or areas of the binary coded numbers may be reflective and non-reflective areas or may be magnetic and non-magnetic areas, depending upon the reading head. The reading head likewise may be an optical reading head or a magnetic reading head.

The quantity of horizontal binary coded numbers may vary depending upon the accuracy and the number of units required. The reading head being arranged to read the reflection or magnetic reading of the particular linear division chosen.

By directly reading the liquid level as a binary coded number, one has a number of advantages over the existing liquid level measuring devices. One advantage is that the reading is digital and direct rather than inferential, thus it is not susceptible to the disadvantages suffered by analogue techniques. The direct reading of binary numbers representing actual height permits the use of standard techniques of error detection and correction to be applied to the numbers read which produce virtually error free readings.

The present invention provides a liquid level measuring device comprising: a fixed vertical scale for a vessel or body of liquid, the fixed scale having a vertical series of horizontal binary coded numbers representing linear divisions; float means to raise and lower with liquid level, the float means movable in a substantially vertical path maintaining a controlled distance from the fixed scale; reading head on the float means to read each of the horizontal binary coded numbers individually on the fixed scale representing liquid level, and connection means from the reading head to a display means to provide an indication of liquid level.

BRIEF DESCRIPTION OF DRAWINGS

In drawings which illustrate embodiments of the present invention.

DESCRIPTION OF THE PREFERRED EMBODIMENTS

Figure 1:
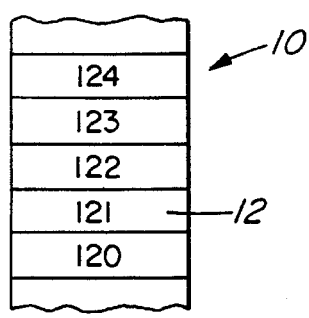
FIG. 1 is a diagram showing a portion of a scale with linear divisions of height.
Figure 2:
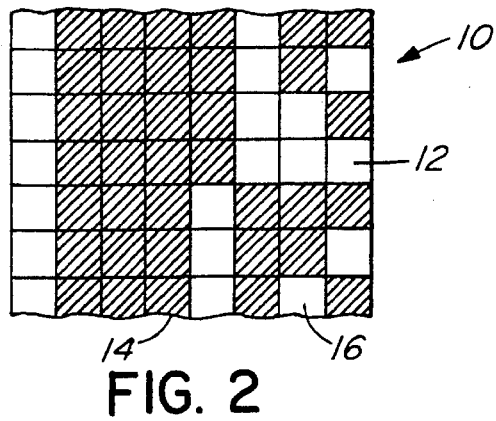
FIG. 2 is a diagram showing a portion of a scale similar to that of FIG. 1 where the linear divisions are represented as a series of horizontal binary coded numbers.

A portion of a scale 10 is shown in FIG. 1 wherein the divisions 12 represent a linear distance such as a millimeter or fraction of an inch. A similar scale 10 shown in FIG. 2 shows the linear divisions 12 as a series of horizontal binary codes with dark bits 14 and light bits 16. The light bits 16 represent reflecting areas and the dark bits 14 represent non-reflecting areas. In another embodiment the dark bits 14 represent magnetic areas deposited on the surface of the screen, and the light bits 16 represent non-magnetic areas.

If, for example, one wishes to read levels to within 1 millimeter, then each millimeter distance represents a linear division 12 and has a binary number thereon. The number of bits in the binary number is determined by the required precision to which to resolve the level. For example, if the height of a vessel is 1 meter and the level is to be resolved within 1 millimeter, then the number of bits required in the binary number is eleven. A binary number of sixteen bits resolves a height of 32.767 meters to within 1 millimeter, that is one part in 32,767.

Figure 3:
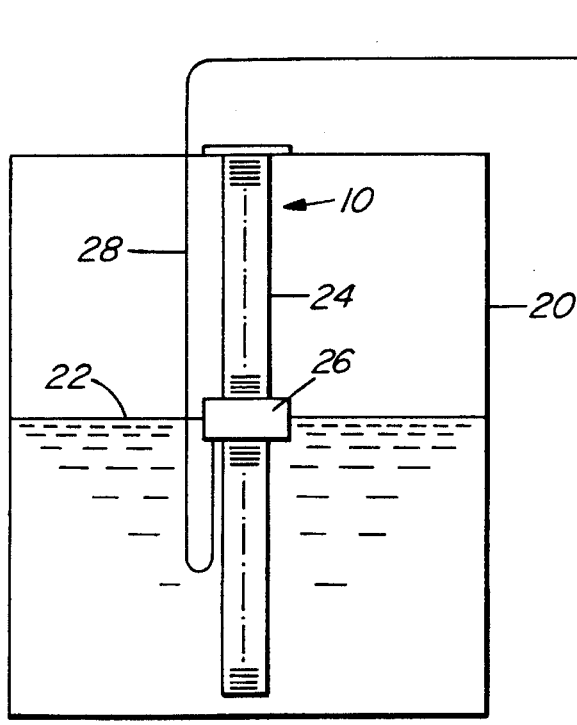
FIG. 3 is an elevational view showing one embodiment of a liquid level measuring device according to the present invention in a vessel.

A vessel 20 shown in FIG. 3 has liquid therein with a liquid level 22. A vertical guide 24 is shown with a fixed vertical scale 10 attached thereto. A float 26 moves up and down the vertical guide 24 and has a reading head to read the horizontal binary coded numbers representing linear divisions 12. A flexible cable 28 connects to a display indicator 30 separate from the vessel 20 and provides a digital indication of liquid level within the vessel 20.

Figure 4:
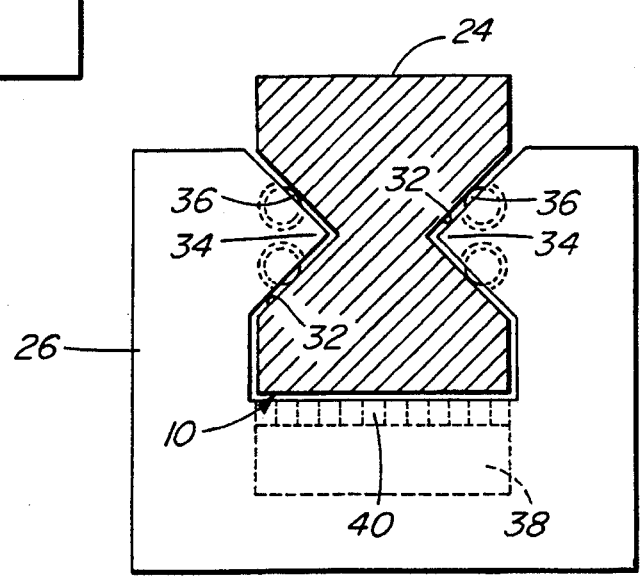
FIG. 4 is a cross-sectional view showing a float mounted for vertical movement on a vertical guide.

One embodiment of a float 26 is shown in more detail in FIG. 4. The guide 24 has two side grooves 32 and the float 26 has protrusions 34 extending into the grooves with bearings 36 that guide the float 26 in the grooves 32. The fixed vertical scale 10 is shown positioned on one surface of the vertical guide 24 and spaced a control distance away from the scale 10 is the reading head 38 which represents a series of individual reading devices 40 to read each bit of the horizontal binary coded number in a linear division 12.

Figure 5:
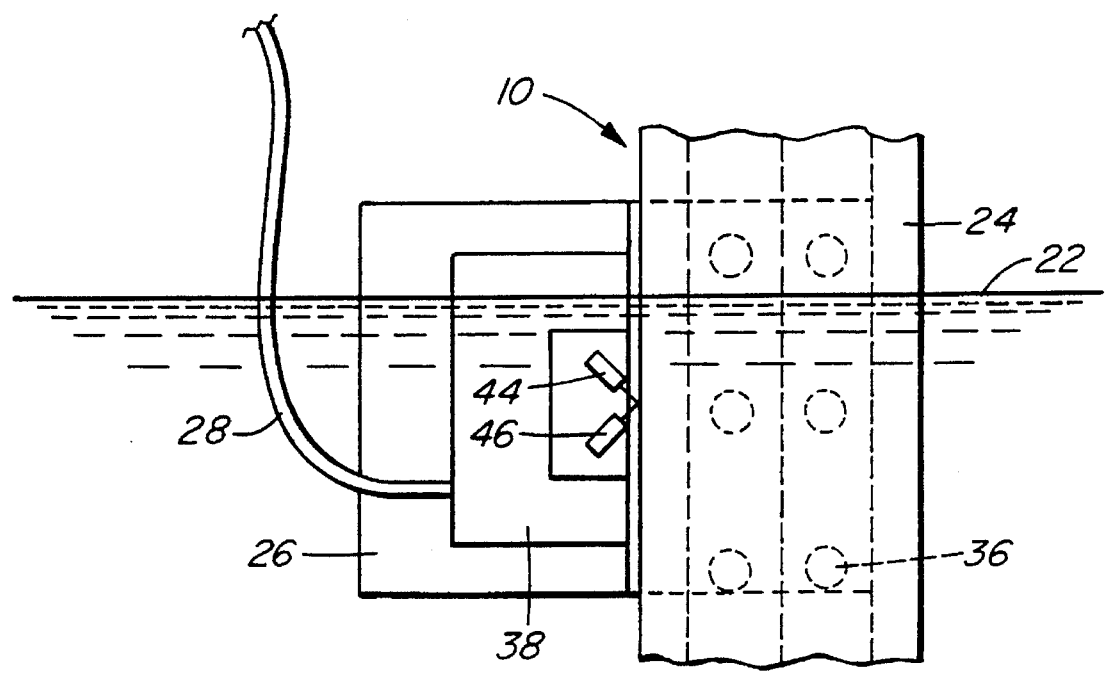
FIG. 5 is a partial side view showing an optical reading head on a float.

FIG. 5 illustrates one type of reading head 38. A light emitting source 44 such as an LED projects light (visible or infra red) onto each bit of a horizontal binary coded number. If the bit is reflective (i.e., a light bit 16), then a light is reflected onto a light sensor 46 such as a phototransistor and a signal is provided through the flexible cable 28 to the display counter 30. If the bit is non-reflective (i.e., a dark bit 14), then no signal is provided. A standard electronic deciphering system for reading digital numbers is provided so that the digital number may be read and shown on the display indicator 30. A light emitting source 44 and light sensor 46 are required for each bit of the binary coded number although a single light source may be used depending upon the particular binary code reader.

In one embodiment the flexible cable 28 is a fibre optic cable and the reflected light is lead directly to individual fibres to be read at a reader in the display indicator 30.

As shown, the light emitting source 44 and light sensor 46 are positioned below the liquid level 22. This avoids refraction which may occur from a surface of the liquid if the light emitting head was above the level of liquid.

Figure 6:
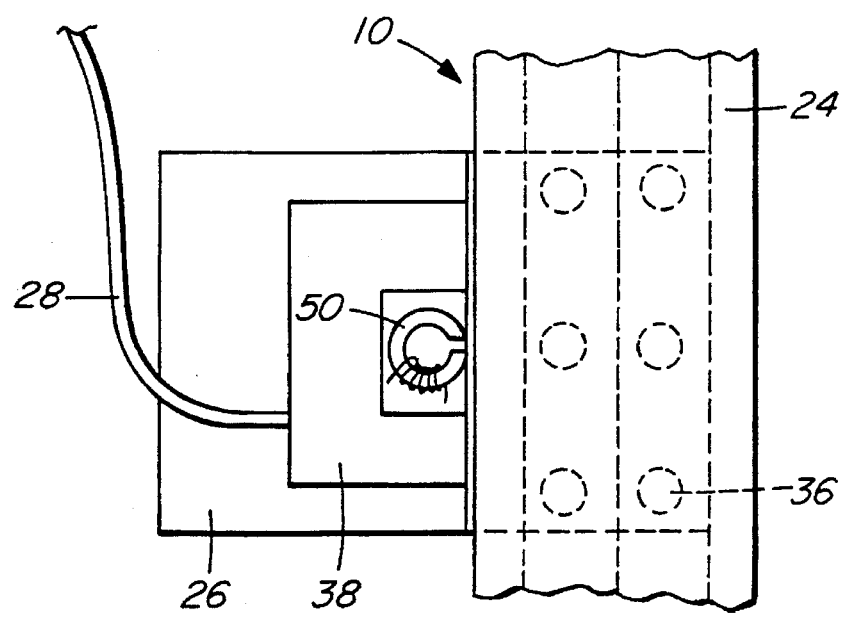
FIG. 6 is a partial side view showing a magnetic reading head on a float.

FIG. 6 illustrates another embodiment of a float arrangements wherein the reading head 38 has a toroidal coil 50 positioned adjacent each bit of the horizontal binary coded numbers. The toroidal coil 50 determines the presence of a magnetic or a non-magnetic area or bit of the binary coded number in the linear division 12 and then provides a signal through cable 28 to the display indicator 30. Cable 28 may be a multi wire flexible electric conductor cable. The signals are passed through an electronic deciphering system to provide a reading of the binary coded number on the display indicator 30.

Figure 7:
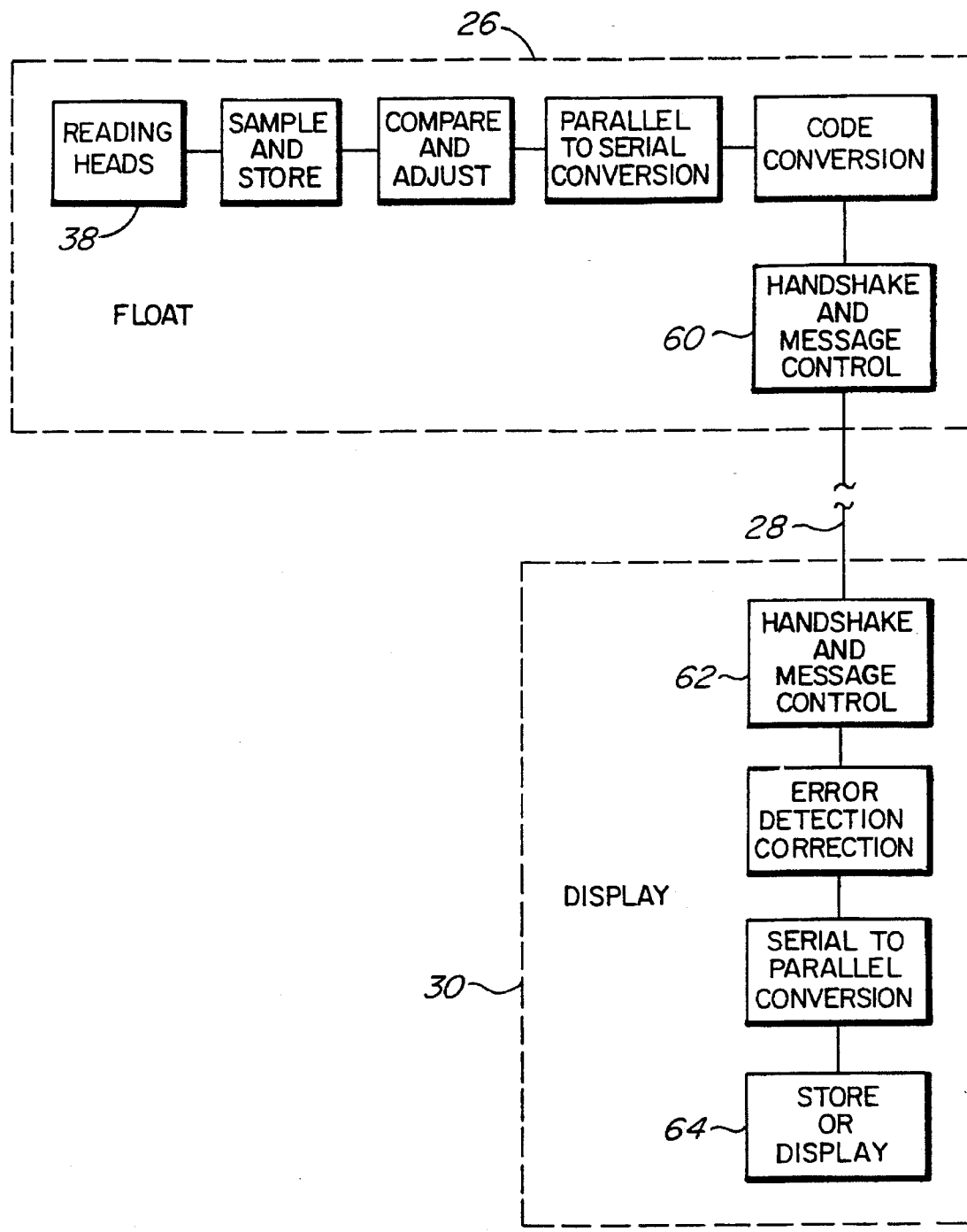
FIG. 7 is a block diagram for a liquid level measuring device according to the present invention with a wire connection between the float and the display.

In the block diagram shown in FIG. 7, the float head 26 has the reading heads 38 therein which sequentially or simultaneously read the binary coded numbers of the scale. The value of the number read is stored and then compared to a previous reading and offset or adjusted if necessary. The signal is converted to a bit stream and the code conversion block, the code is modified for error control. The converted signal is passed to the handshake and message control 60 on the float head 26 which communicates through the cable 28 to the handshake and message control 62 associated with the display 30. This arrangement provides request/respond co-ordination. An error detection and correction circuit is shown and the bit stream reconverted to provide a signal for storage or display 64. This signal may be transmitted to a master station, a computer, a programmable controller or a display or indicator device.

Figure 8:
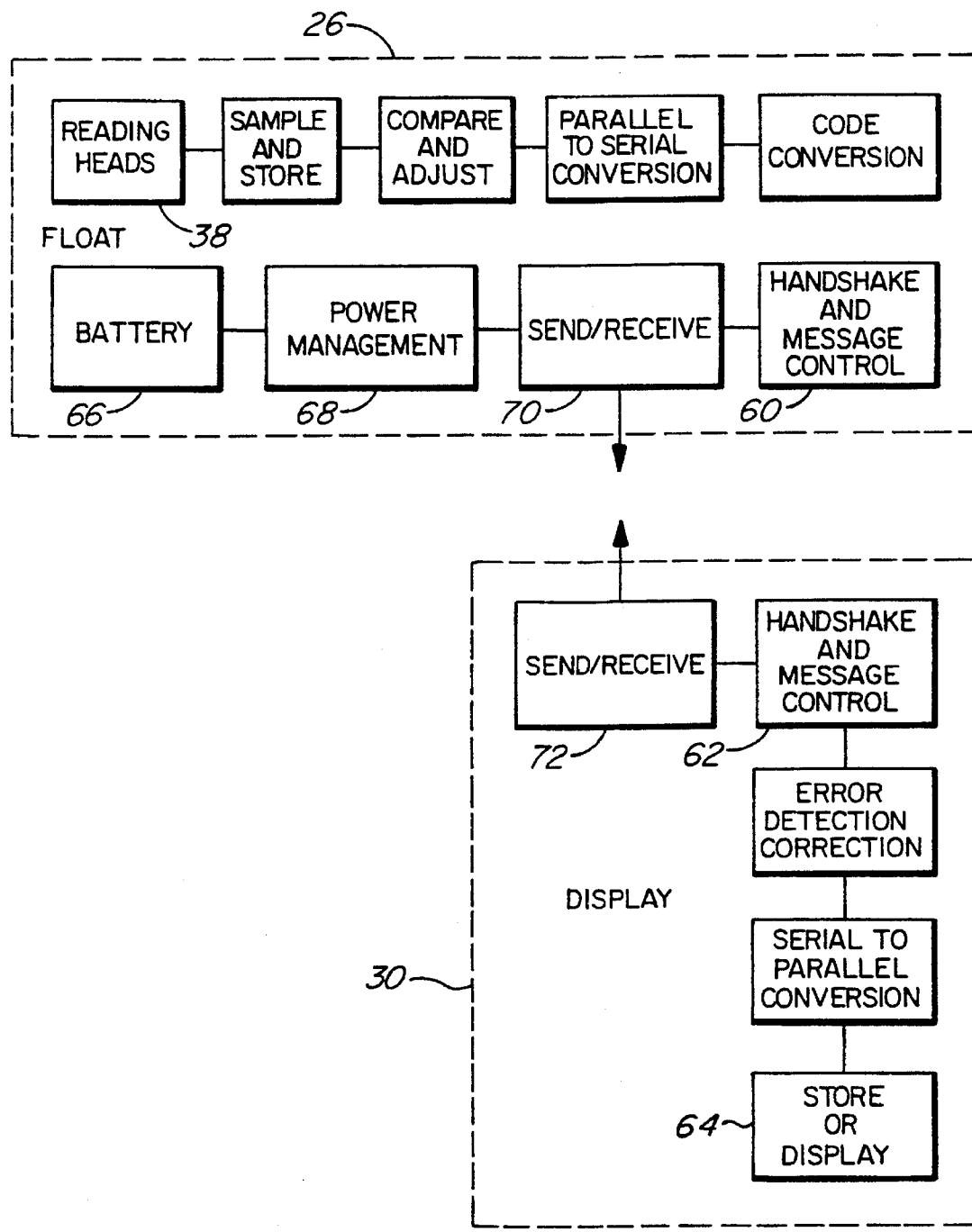
FIG. 8 is a block diagram for a liquid level measuring device according to the present invention with a radio link between the float and the display.

In the block diagram shown in FIG. 8, the cable 28 is removed and a power source in the form of a battery 66 is included in the float head 26. A power management control 68 provides distribution, isolation and sleep wake up to a radio link with a transmitter/receiver 70 in the float head 26 and a corresponding transmitter/receiver 72 with the display 30. The transmitter/receiver 70,72 transmits the signals between the handshake and message control 60,62.

The readings need not be made continuously, but at appropriate intervals so that only changes in level are processed and shown. The digital reading can be detected for error and be corrected for error electronically. Furthermore, the reading can be offset for zero by adding or subtracting another number. The liquid measurement is not subject to calibration errors as one is always reading a digital number and furthermore, the level measurement is not subject to drift.

Various changes may be made to the embodiments shown herein without departing from the scope of the present invention which is limited only by the following claims.

The embodiments of the present invention in which an exclusive property or privilege is claimed are defined as follows:

1. A liquid level measuring device comprising:
   a vertical guide having a fixed vertical scale for a vessel or a body of liquid mounted on the vertical guide, the fixed scale having a vertical series of horizontal binary coded bits representative of binary coded numbers indicating linear divisions;
   float means to raise and lower with liquid level, said float means having means for cooperating with portions of said vertical guide for keeping the float means movable in a substantially vertical path adjacent the fixed vertical scale while maintaining a controlled distance from the fixed scale;
   reading head on the float means to read each of the horizontal binary coded bits individually on the fixed scale representing liquid level, and
   connection means for providing a level signal from the reading head to a means for displaying an indication of liquid level.

2. The liquid level measuring device according to claim 1 wherein each of the series of horizontal binary coded bits representing linear divisions have reflecting and non-reflecting areas, and the reading head comprises a light emitting source means for projecting light onto each of the areas and light sensors to determine whether each of the areas is reflecting or non-reflecting, the light sensors providing reflected light signals representing each reflecting area of the binary coded bits to the display means.

3. The liquid level measuring device according to claim 2 wherein the light emitting source means and light sensors are positioned below liquid level.

4. The liquid level measuring device according to claim 1 wherein each of the series of horizontal binary coded bits representing linear divisions have magnetic and non-magnetic areas, and the reading head comprises a magnetic sensing means to determine whether each of the areas is magnetic or non-magnetic, the magnetic sensing means providing a signal representing each of the binary coded bits to the display means.

5. The liquid level measuring device according to claim 1 wherein the means maintaining the controlled distance includes bearings.

6. The liquid level measuring device according to claim 1 wherein the connection means includes a multi wire flexible electric conductor cable from the reading head to the display means.

7. The liquid level measuring device according to claim 1 wherein the reading head has internal power source in the float means and the connection means includes a radio transmitter/receiver link from the reading head to the display means.

8. The liquid level measuring device according to claim 2 wherein the connection means includes flexible fibre optic cables and wherein reflected light signals representing each of the reflecting areas of the binary coded bits are fed through the flexible fibre optic cables to the display means.

* * * * *